(12) United States Patent
Roehling et al.

(10) Patent No.: US 10,888,956 B2
(45) Date of Patent: Jan. 12, 2021

(54) SYSTEM AND METHOD FOR GRAIN REFINEMENT AND GENERAL CONTROL OF GRAIN MORPHOLOGY IN LASER ADDITIVE MANUFACTURING

(71) Applicant: Lawrence Livermore National Security, LLC, Livermore, CA (US)

(72) Inventors: Tien Roehling, Tracy, CA (US); Gabe Guss, Manteca, CA (US); Saad Khairallah, Livermore, CA (US); Manyalibo Joseph Matthews, Livermore, CA (US); Sheldon S. Wu, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 203 days.

(21) Appl. No.: 16/010,111

(22) Filed: Jun. 15, 2018

(65) Prior Publication Data

US 2019/0381602 A1 Dec. 19, 2019

(51) Int. Cl.
*B23K 26/34* (2014.01)
*B33Y 10/00* (2015.01)
(Continued)

(52) U.S. Cl.
CPC ........ *B23K 26/342* (2015.10); *B23K 26/0006* (2013.01); *B23K 26/0626* (2013.01);
(Continued)

(58) Field of Classification Search
CPC ............ B23K 26/34–342; B33Y 10/00; B33Y 30/00; B33Y 50/00; B29C 64/20; B29C 64/268–273; B29C 64/153
See application file for complete search history.

(56) References Cited

U.S. PATENT DOCUMENTS 6,791,094 B1  9/2004 Olson et al.
9,452,474 B2 *  9/2016 Xu .......................... B23P 6/005
(Continued)

FOREIGN PATENT DOCUMENTS

WO   WO-2015179989 A1   12/2015
WO   WO-2017131943 A1    8/2017

OTHER PUBLICATIONS

International Search Report and Written Opinion for Regarding Application No. PCT/US2019/018663, dated May 31, 2019.
(Continued)

*Primary Examiner* — Michael A Laflame, Jr.
(74) *Attorney, Agent, or Firm* — Harness, Dickey & Pierce, P.L.C.

(57) ABSTRACT

The present disclosure relates to a system for forming a material layer that may make use of an optical light source for generating an optical beam, and a beam shaping subsystem configured to shape the optical beam to generate a complex beam intensity profile. The complex shaped beam may be used to selectively melt at least portions of a bed of powder particles residing on a substrate during formation of the material layer, as the optical light source is moved. A computer may be used to control the optical light source. The complex beam intensity profile enables control over the microstructure of grains formed during melting of the powder particles as the material layer is formed.

15 Claims, 11 Drawing Sheets

(51) Int. Cl.
| | |
|---|---|
| B33Y 30/00 | (2015.01) |
| B33Y 50/00 | (2015.01) |
| B23K 26/342 | (2014.01) |
| B33Y 50/02 | (2015.01) |
| B23K 26/00 | (2014.01) |
| B23K 26/082 | (2014.01) |
| B23K 26/073 | (2006.01) |
| B23K 26/06 | (2014.01) |

(52) U.S. Cl.
CPC ........ *B23K 26/073* (2013.01); *B23K 26/0734* (2013.01); *B23K 26/0736* (2013.01); *B23K 26/0821* (2015.10); *B33Y 30/00* (2014.12); *B33Y 50/02* (2014.12)

(56) References Cited

U.S. PATENT DOCUMENTS

| | | | | |
|---|---|---|---|---|
| 2005/0040147 | A1* | 2/2005 | Hoebel | B23K 26/032 219/121.64 |
| 2016/0201155 | A1* | 7/2016 | Niendorf | A61L 31/024 420/72 |
| 2016/0326880 | A1* | 11/2016 | Slavens | B22F 3/1055 |
| 2017/0165789 | A1 | 6/2017 | Demos | |
| 2017/0341145 | A1 | 11/2017 | Foster et al. | |
| 2018/0029127 | A1 | 2/2018 | Ng et al. | |
| 2018/0200798 | A1* | 7/2018 | Sharon | B23K 26/0006 |
| 2018/0250744 | A1* | 9/2018 | Symeonidis | B23K 26/034 |
| 2019/0321916 | A1* | 10/2019 | Schwarze | F01D 5/005 |

OTHER PUBLICATIONS

T. Niendorf, S. Leuders, A. Riemer, H.A. Richard, T. Tröster, D. Schwarze, Highly Anisotropic Steel Processed by Selective Laser Melting, Metall. Mater. Trans. B. 44 (2013) 794-796. doi:10.1007/s11663-013-9875-z.

E. Yasa, J.-P. Kruth, Microstructural investigation of Selective Laser Melting 316L stainless steel parts exposed to laser re-melting, Procedia Eng. 19 (2011) 389-395. doi:10.1016/j.proeng.2011.11.130.

L. Thijs, K. Kempen, J.-P. Kruth, J. Van Humbeeck, Fine-structured aluminium products with controllable texture by selective laser melting of pre-alloyed AlSi10Mg powder, Acta Mater. 61 (2013) 1809-1819. doi:10.1016/j.actamat.2012.11.052.

L. Thijs, M.L. Montero Sistiaga, R. Wauthle, Q. Xie, J.-P. Kruth, J. Van Humbeeck, Strong morphological and crystallographic texture and resulting yield strength anisotropy in selective laser melted tantalum, Acta Mater. 61 (2013) 4657-4668. doi:10.1016/j.actamat.2013.04.036.

W.-C. Huang, K.-P. Chang, P.-H. Wu, C.-H. Wu, C.-C. Lin, C.-S. Chuang, D.-Y. Lin, S.-H. Liu, J.-B. Horng, F.-H. Tsau, 3D Printing Optical Engine for Controlling Material Microstructure, Phys. Procedia. 83 (2016) 847-853. doi:10.1016/j.phpro.2016.08.088.

S.R.K. Rao, G.M. Reddy, M. Kamaraj, K.P. Rao, Grain refinement through arc manipulation techniques in Al—Cu alloy GTA welds, Mater. Sci. Eng. A. 404 (2005) 227-234. doi:10.1016/j.msea.2005.05.080.

C.J. Paradies, R.N. Smith, M.E. Glicksman, The influence of convection during solidification on fragmentation of the mushy zone of a model alloy, Metall. Mater. Trans. A. 28 (1997) 875-883. doi:10.1007/s11661-997-0075-9.

T.T. Roehling, S.S.Q. Wu, S.A. Khairallah, J.D. Roehling, S.S. Soezeri, M.F. Crumb, M.J. Matthews, Modulating laser intensity profile ellipticity for microstructural control during metal additive manufacturing, Acta Mater. 128 (2017) 197-206. doi:10.1016/j.actamat.2017.02.025.

Y.M. Wang, T. Voisin, J.T. McKeown, J. Ye, N.P. Calta, Z. Li, Z. Zeng, Y. Zhang, W. Chen, T.T. Roehling, R.T. Ott, M.K. Santala, P.J. Depond, M.J. Matthews, A.V. Hamza, T. Zhu, Additively manufactured hierarchical stainless steels with high strength and ductility, Nat. Mater. 17 (2018) 63. doi:10.1038/nmat5021.

S.A. Khairallah, A.T. Anderson, A. Rubenchik, W.E. King, Laser powder-bed fusion additive manufacturing: Physics of complex melt flow and formation mechanisms of pores, spatter, and denudation zones, Acta Mater. 108 (2016) 36-45. doi:10.1016/j.actamat.2016.02.014.

* cited by examiner

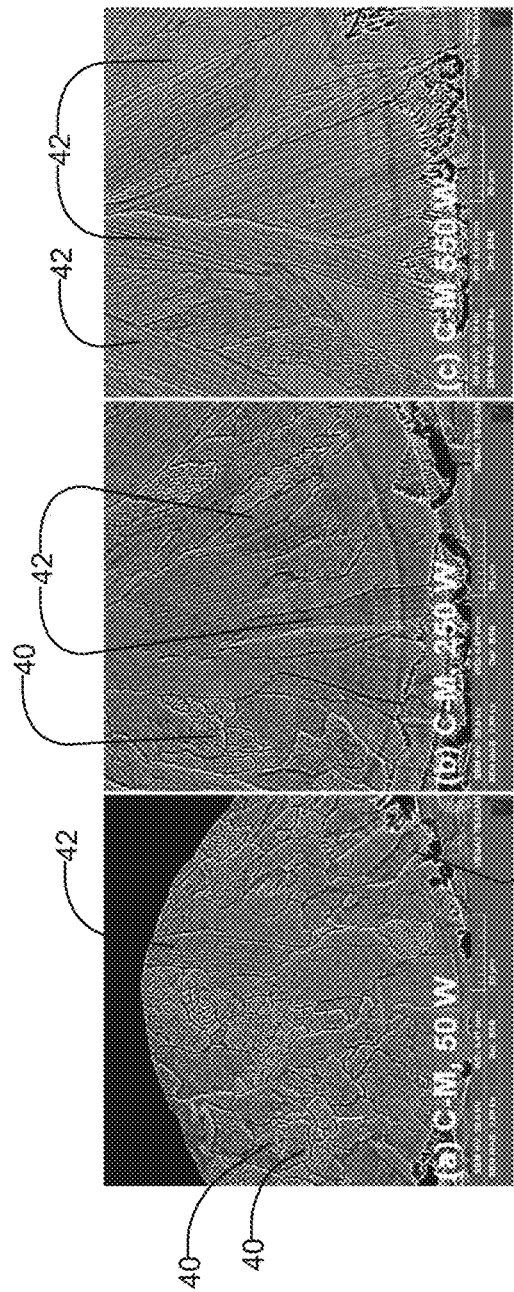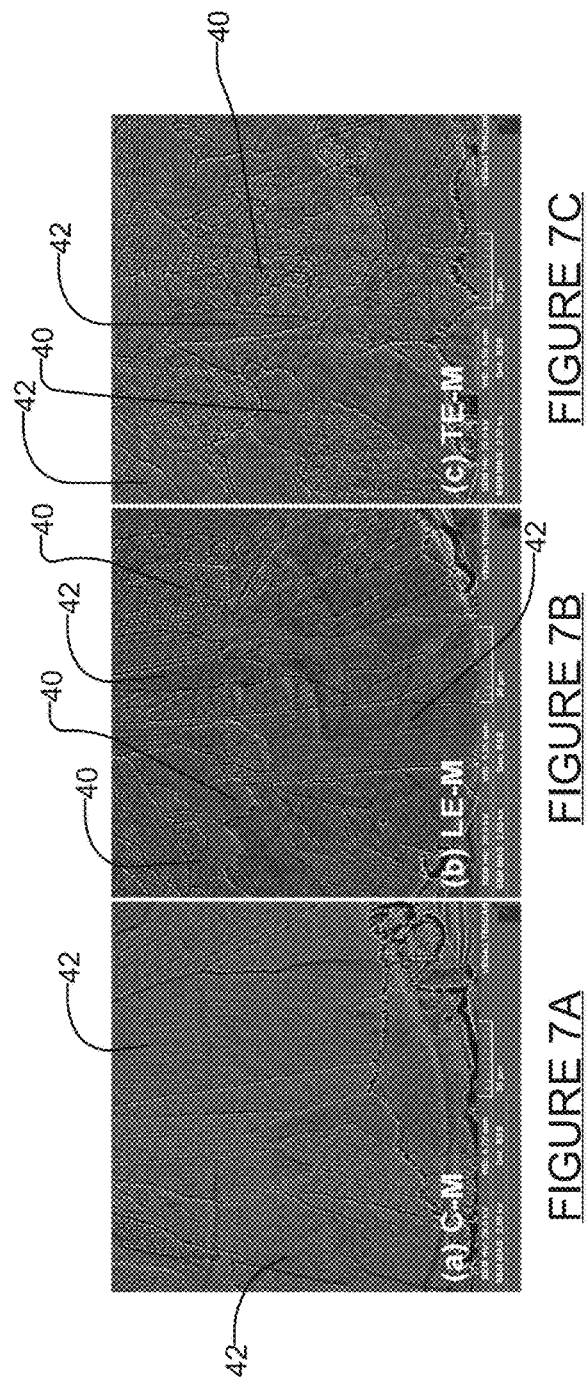
FIGURE 6A  FIGURE 6B  FIGURE 6C
FIGURE 7A  FIGURE 7B  FIGURE 7C

SYSTEM AND METHOD FOR GRAIN REFINEMENT AND GENERAL CONTROL OF GRAIN MORPHOLOGY IN LASER ADDITIVE MANUFACTURING

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for laser-based processing of materials, and more particularly to systems and methods that employ energy source beam shaping to control the grain morphology in additively manufactured parts.

BACKGROUND

This section provides background information related to the present disclosure which is not necessarily prior art.

During laser-based processing of materials such as powder bed fusion (LPBF) additive manufacturing (AM), processing parameters including but not limited to laser power, scan speed, scan pattern, and hatch spacing have typically been optimized to improve geometrical accuracy and reduce defect concentrations. In taking this macroscopic approach, the microstructure-property relationships underlying the performance disparities between conventionally machined and AM-produced parts are often overlooked. A central problem is that additively manufactured materials contain coarse columnar grains that reduce grain boundary strengthening effects and diminish mechanical isotropy. Microstructures containing equiaxed grains are desirable for isotropic mechanical behavior. Equiaxed grains are those that exhibit similar dimensions in each of the X-, Y- and Z-directions. Columnar grains are elongated, usually in the direction of solidification. Practical methods for inducing the columnar-to-equiaxed transition (CET) during LPBF have not been identified prior to the present disclosure.

Laser-based AM parameter effects on grain morphology have been studied using high-powered lasers (T. Niendorf, S. Leuders, A. Riemer, H. A. Richard, T. Tröster, D. Schwarze, "*Highly Anisotropic Steel Processed by Selective Laser Melting*", Metall. Mater. Trans. B, Vol. 44, Issue 4, August 2013, pp. 794-796. https://doi.org/10.1007/s11663-013-9875-z), by employing laser re-melting (E. Yasa, J-P. Kruth, "*Microstructural Investigation of Selective Laser Melting 316L Stainless Steel Parts Exposed to Laser Re-Melting*", Procedia Eng., Vol. 19, 2011, pp. 389-395. https://doi.org/10.1016/j.proeng.2011.11.130), and by varying laser scanning directions (L. Thijs, K. Kempen, J-P. Kruth, J. Van Humbeeck, "*Fine-Structured Aluminium Products With Controllable Texture by Selective Laser Melting of Pre-Alloyed Alsi10 mg Powder*", Acta Mater., Vol. 61, Issue 5, March 2013, pp. 1809-1819. https://doi.org/10.1016/j.actamat.2012.11.052; and L. Thijs, M. L. Montero Sistiaga, R. Wauthle, Q. Xie, Jean-Pierre Kruth, J. Van Humbeeck, "*Strong Morphological And Crystallographic Texture And Resulting Yield Strength Anisotropy In Selective Laser Melted Tantalum*", Acta Mater., Vol. 61, March 2013, pp. 4657-4668. https://doi.org/10.1016/j.actamat.2013.04.036). High-powered laser and laser re-melting approaches maintain or aggravate the severity of columnar solidification, creating a strongly textured microstructure. On the other hand, by varying laser scanning directions on a layer-by-layer basis, columnar grains still form, but their epitaxial growth through multiple layers can be avoided, thus limiting their overall size. Some microstructural refinement has been achieved by spiraling the laser as it traverses along a defined path, like the controlled movement of a laser during "wobble mode" laser welding (B. K. Foster, J. Marchal, A. Sadek, S. M. Kelly, "*Laser-Stirred Powder Bed Fusion*", U. S. Pat. Appl. Publ. US 2017/0341145 A1 (2017)).

Recently, complex laser beam shapes for AM have been investigated by the Industrial Technology Research Institute (ITRI) in Taiwan (Wein-Chin Huang, Kuang-Po Chang, Ping-Han Wu, Chih-Hsien Wu, Ching-Chih Lin, Chuan-Sheng Chuang, De-Yau Lin, Sung-Ho Liu, Ji-Bin Horng, Fang-Hei Tsau, "*3D Printing Optical Engine for Controlling Material Microstructure*", Phys. Procedia, Vol. 83, 2016, pp. 847-853. https://doi.orq/10.1016/j.phpro.2016.08.088). However, the ITRI group has not considered the effects of these beams on solidification microstructure or the CET, nor the effect of more complex beam shapes beyond apparent superposition of two beams. Only cursory low-magnification images showing laser scanning patterns (i.e., "fish scale" patterns") have been disseminated.

Grain refinement during an AM printing process can be encouraged by creating a strong turbulent flow in the solidifying melt. This can be accomplished by changing the beam intensity spatially or temporally (modulating the power output at an appropriate frequency). Rao et al. demonstrated several techniques by which grain refinement could be encouraged during gas tungsten arc welding (S. R. Koteswara Rao, G. Madhusudhana Reddy, M. Kamaraj, K. Prasad Rao, "*Grain Refinement Through Arc Manipulation Techniques In Al—Cu Alloy GTA Welds*", Mater. Sci. Eng. A, Vol. 404, Issues 1-2, September 2005, pp. 227-234. https://doi.org/10.1016/j.msea.2005.05.080). These techniques were based on creating turbulent flow to fragment fledgling dendrites growing from the bottom of the melt pool. Fundamental solidification studies have shown that the dendrite fragmentation rate increases with melt flow velocity (C. J. Paradies, R. N. Smith, M. E. Glicksman, "*The Influence of Convection During Solidification on Fragmentation of the Mushy Zone of a Model Alloy*", Metall. Mater. Trans. A, Vol. 28, Issue 3, March 1997, pp. 875-883. https://doi.org/10.1007/s11661-997-0075-9). Upon breakup, the dendrite fragments are carried into the melt where they act as heterogeneous nuclei for equiaxed grains.

Compared to prior systems, the present disclosure involves designing and implementing accurately-controlled beam intensity profiles for microstructural control during laser-based additive manufacturing. These optimized laser energy sources allow end users to precisely tailor site-specific grain morphologies, and thus material properties. The present disclosure further implements methods to generate the arbitrary beam profiles needed for the desired microstructure.

SUMMARY

This section provides a general summary of the disclosure, and is not a comprehensive disclosure of its full scope or all of its features.

In one aspect the present disclosure relates to a system for forming a material layer. The system may comprise an optical light source for generating an optical beam, and a beam shaping subsystem configured to receive and shape the optical beam to generate a complex beam intensity profile. The complex beam intensity profile may be used to selectively melt at least portions of a powder bed of powder particles residing on a substrate during formation of the material layer, as at least one of the laser or the powder bed is moved. The system may also include a computer for controlling the optical light source. The complex beam intensity profile may be configured to tailor the microstructures formed during solidification of the melted powder particles in at least a portion of the material layer.

In another aspect the present disclosure relates to an additive manufacturing system. The system may have a laser for generating a laser beam. A beam shaping subsystem may be included which is configured to receive and shape the laser beam to selectively generate a complex shaped beam profile, to selectively melt at least portions of a powder bed of powder particles residing on a substrate during formation of a layer of a part, as the laser is moved. A computer may also be included which is configured to control the beam shaping subsystem. The complex shaped beam profile may be selected by the computer to control microstructures of grains formed during melting of the powder particles to increase a percentage of equiaxed grains relative to columnar grains formed in the melted powder bed.

In still another aspect the present disclosure relates to a method for additively manufacturing a part. The method may comprise generating an optical beam and shaping the optical beam to produce a complex shaped beam profile. The method may further include using the complex shaped beam profile to selectively melt at least portions of a powder bed of powder particles residing on a substrate during formation of a layer of a part, as at least one of the laser or the powder bed is moved. The method may further include using a computer to control a power of the optical beam, and using the complex shaped beam profile to control microstructures of grains formed during melting of the powder particles to tailor a formation of equiaxed grains relative to columnar grains formed in the powder bed as the powder bed is melted.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings:

FIGS. 6A-6C show scanning electron microscope images of cross-sections of melt track roots produced using a circular medium-sized ("C-M") beam profile at different power levels; the area fraction of the microstructure occupied by equiaxed grains decreases as the beam power increases;

FIGS. 7A-7C show scanning electron microscope images of cross-sections of melt track roots produced at constant beam size, power and energy density as beam shape is varied; the area fraction of the microstructure occupied by equiaxed grains increases as the beam shape is changed from a circular-Gaussian to a longitudinal-elliptical or transverse-elliptical beam shape;

Corresponding reference numerals indicate corresponding parts throughout the several views of the drawings.

DETAILED DESCRIPTION

Example embodiments will now be described more fully with reference to the accompanying drawings.

The present disclosure involves novel laser-based microstructure control techniques which may be applied to a laser-based materials processing technology, for example, a powder bed fusion additive manufacturing process. The present disclosure presents systems and methods that make use of high flux convection, caused by carefully tailored beam shapes, which leads to grain refinement during an AM printing process. In one implementation, complex beam intensity profiles may be used to produce a higher volume fraction of equiaxed grains than what would be predicted by solidification theories that ignore melt flow. In contrast, simply using a conventional symmetric (or circular) Gaussian intensity beam profile at the same laser power and energy deposition produces large, columnar grains. Simulations have demonstrated that significantly higher melt flow is produced by, for example, elliptical beams than by circular beams. The homogeneous nucleation of equiaxed grains is unlikely under the steep, directional temperature gradients and high cooling rates imposed by a laser AM process. However, equiaxed growth can be initiated by strong, turbulent melt flow and subsequent dendrite fragmentation. This growth modification can be exacerbated through use of specifically tailored, non-Gaussian beam shapes.

Figure 1:
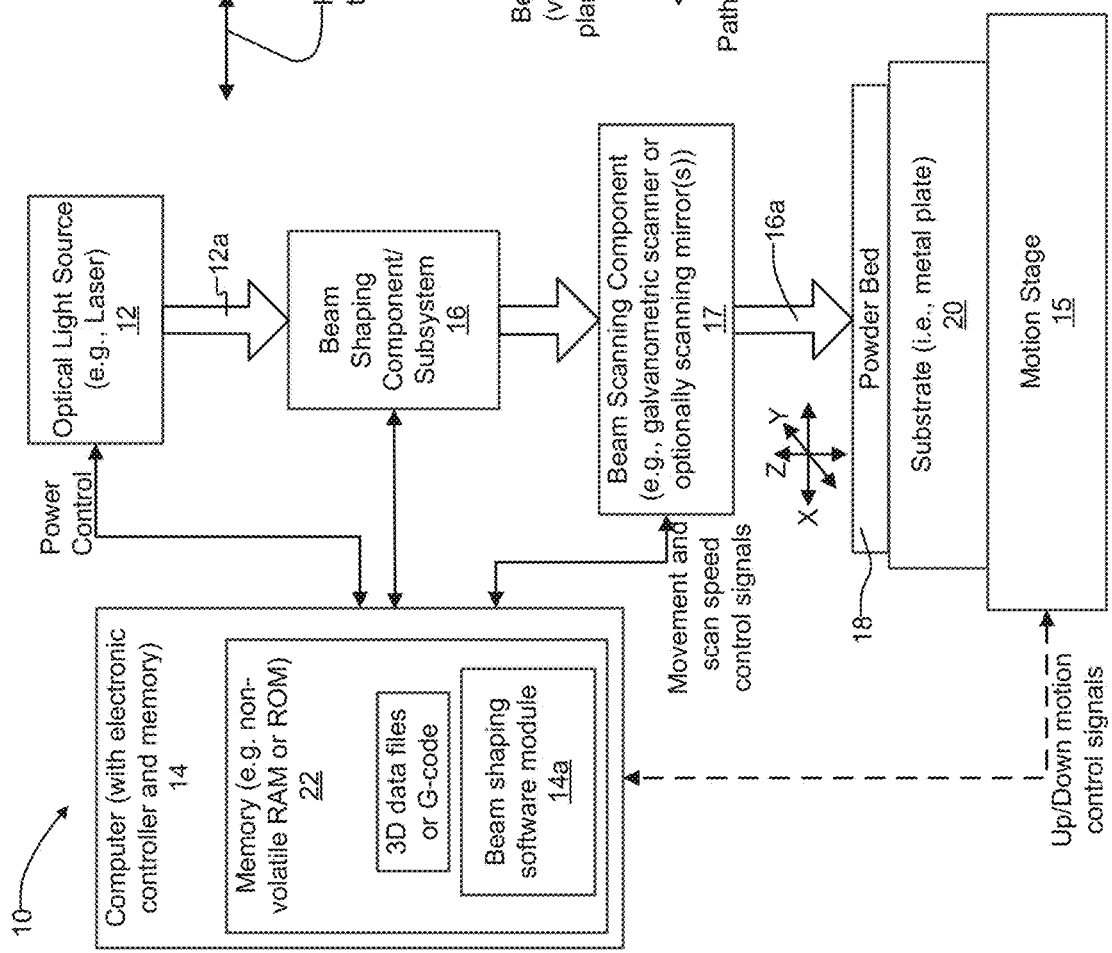
FIG. 1 is a high-level block diagram of major components that may be used to form a system in accordance with the present disclosure.

Referring to FIG. 1, there is shown one example of an additive manufacturing system 10 in accordance with the present disclosure. In this example the system 10 may include an optical light source 12 which generates an optical beam 12a. In one embodiment the optical light source 12 may be a laser. For convenience, the optical light source 12 will be referred to throughout the following discussion simply as "laser 12." The laser 12 may be controlled by a computer 14. The computer 14 may include a beam shaping software module 14a which may be used to control a beam shaping component or subsystem 16, as well as a beam movement component 17. The beam movement component 17 may be, for example, a galvanometric scanner, and is responsible for scanning the beam in a desired pattern.

The beam shaping subsystem 16 receives the beam 12a from the laser 12 and shapes the beam into a desired shape (e.g., elliptical) to provide a shaped beam 16a. The shaped beam 16a may be scanned using the beam movement component 17 (hereinafter simply the "galvanometric scanner 17") and used to melt powdered material (e.g., metal, plastic, etc.) which forms a powder bed 18 deposited on a substrate 20. The shaped beam 16a is controlled while melting each layer of the powder bed 18 to better control the grain morphology as the particles melt and solidify.

The computer 14 may control application of the power generated by the laser 12 (i.e., the beam power), as well as the shaping of the beam 12a, to create the shaped beam 16a. The computer 14 is configured to also vary the beam power of the laser beam 12a while scanning the shaped beam 16a over the powder bed 18 to form a single layer of the part being formed. The computer 14 may further control the application of the shaped beam 16a in X- and Y-directions over the powder bed 18 through the use of a galvanometric scanner 17. The galvanometric scanner 17 may be controlled in accordance with stored 3D data files which define the needed movement of the shaped beam 16a in X and Y directions, as well as the scan speed of the beam 16a, relative to the powder bed 18, to create each layer of the part. The computer 14 may also control the motion stage 15 in the Z direction using stored 3D data files to impart the needed relative movement of the motion stage 15 when a new layer of powder needs to be deposited prior to forming a new layer of the part. Optionally, the output from laser 12 and beam shaping subsystem 16 may be scanned using scanner mirrors. The computer 14 may also simultaneously control and vary each of the beam power, the scan speed and the shaping of the beam 12a, as needed, in real time, while melting the powder bed (i.e., during formation of a single layer of a part being formed on the substrate 20), to optimize the structural characteristics of the fully formed part. The computer 14 may be a microprocessor-controlled computer with non-volatile memory (RAM or ROM) 22 for storing the beam shaping software module 14a. When moved using either the galvanometric scanner 17 or scanner mirrors, the shaped beam 16a melts the powder particles making up the powder bed 18 according to a predetermined scan pattern to form a single layer of the part. This operation is repeated in a layer-by-layer process, as additional powder material is deposited on the previously formed layer, to form a complete part.

With typical prior developed AM systems, the laser beam would be used to melt select portions (or possibly all) of each layer of the part, using a circular Gaussian laser intensity profile. it is an important feature of the system 10 that the beam 16a profile is tailored to induce the columnar-to-equiaxed transition by modifying convective melt flow in the melt track as the powder bed 18 and previous layer(s) is laser-melted. By "melt track" it is meant the track or path that the beam 16a is moved along during a scan, which produces a track or path of melted material from the powder bed 18. With the ability to control microstructures locally and on-the-fly by shaped beam 16a via power intensity profile modulation during formation of a layer of a part, site-specific properties can be directly engineered into additively manufactured parts. Such site-specific properties may be strength, hardness, fatigue resistance, creep resistance, etc. The shaped beam 16a can be controlled to selectively tune the equiaxed grain content (relative to the columnar grain content) within a given layer, and/or in specific locations, and/or throughout all layers of a completed part. Thus, the present invention provides a new design capability for additively manufactured parts that does not currently exist.

In experiments, melt flow was enhanced by changing the shaped beam 16a intensity profile from the standard Gaussian (i.e., circular) laser output to complex optimal profile using various optical devices. Specifically, elliptical beams of varied sizes were formed using an anamorphic prism pair and a beam expander or cylindrical lenses as the beam shaping subsystem 16, but other tailored beam profiles achieved by various means can also impose a columnar-to-equiaxed transition. The initial experiments were performed on a Laser Powder Bed Fusion (LPBF) testbed capable of melting single laser tracks, or welds, onto a substrate. In this case, 316L stainless steel was used.

Under conduction-mode laser heating conditions, tracks melted using elliptical beams contained a larger fraction of equiaxed grains than those formed using circular beams. To elucidate the mechanisms behind the microstructural differences, multiphysics simulations were performed. It was found that, while varying the beam shape and size in the regime explored did not change the temperature gradient dramatically, melt flow velocities and the nature of melt flow were affected. Compared to circular beams, elliptical beams produced faster melt flow that likely contributed to dendrite fragmentation and the nucleation of equiaxed grains. Complex beam profiles further improve material fabrication process and material properties.

Figure 3:
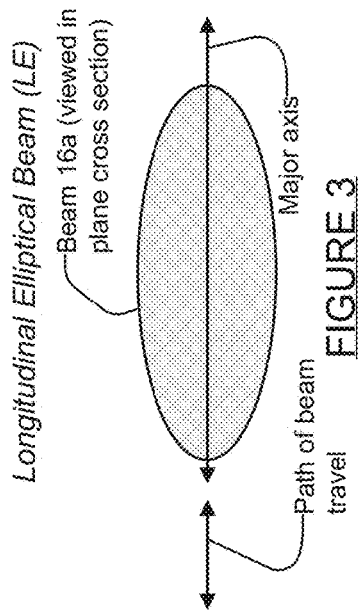
FIG. 3 is a diagram illustrating a longitudinal-elliptical beam shape relative to a direction of travel of the beam.
Figure 4:
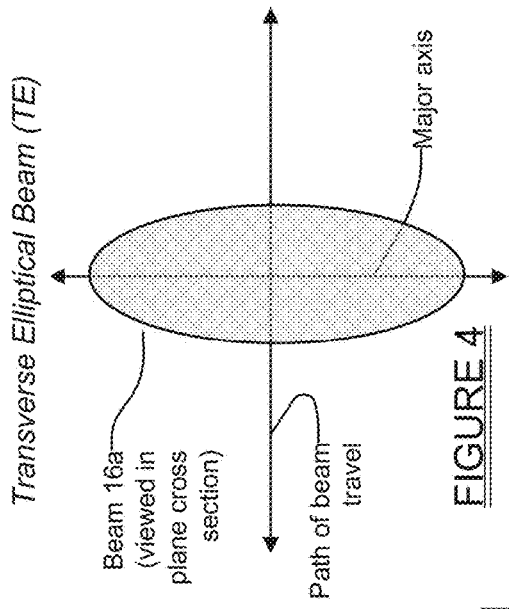
FIG. 4 is a diagram illustrating a transverse-elliptical beam shape relative to a direction of travel of the beam.
Figure 5:
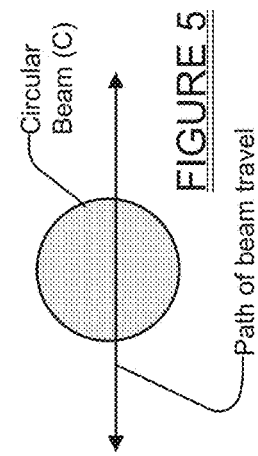
FIG. 5 is a diagram illustrating a circular beam profile relative to a direction of travel of the beam.
Figure 2A:
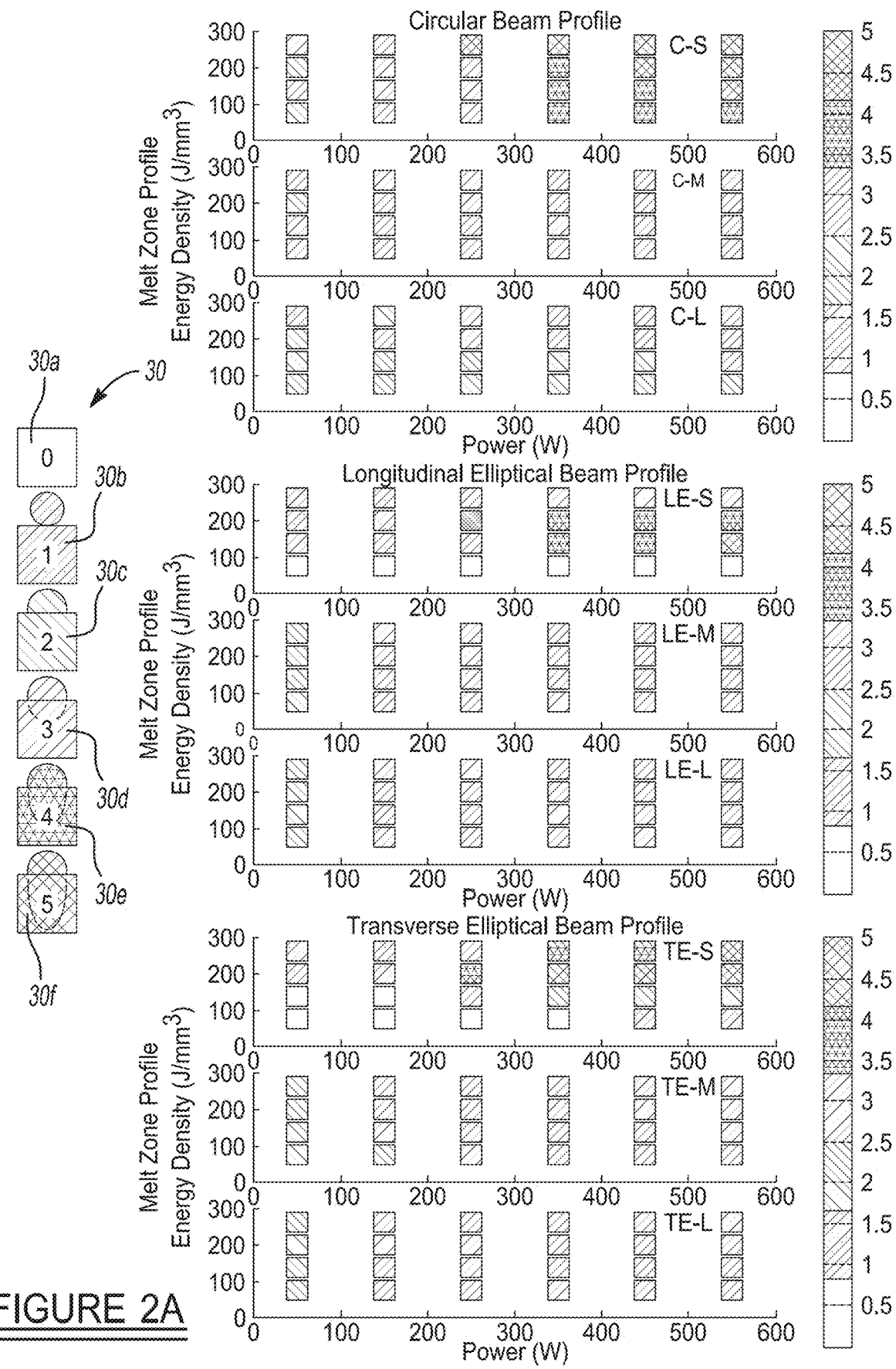
FIG. 2A shows a processing map of energy density ($J/mm^3$) versus laser power for an arbitrary complex beam such as a circular beam profile, a longitudinal-elliptical beam profile, and a transverse-elliptical beam profile.
Figure 2B:
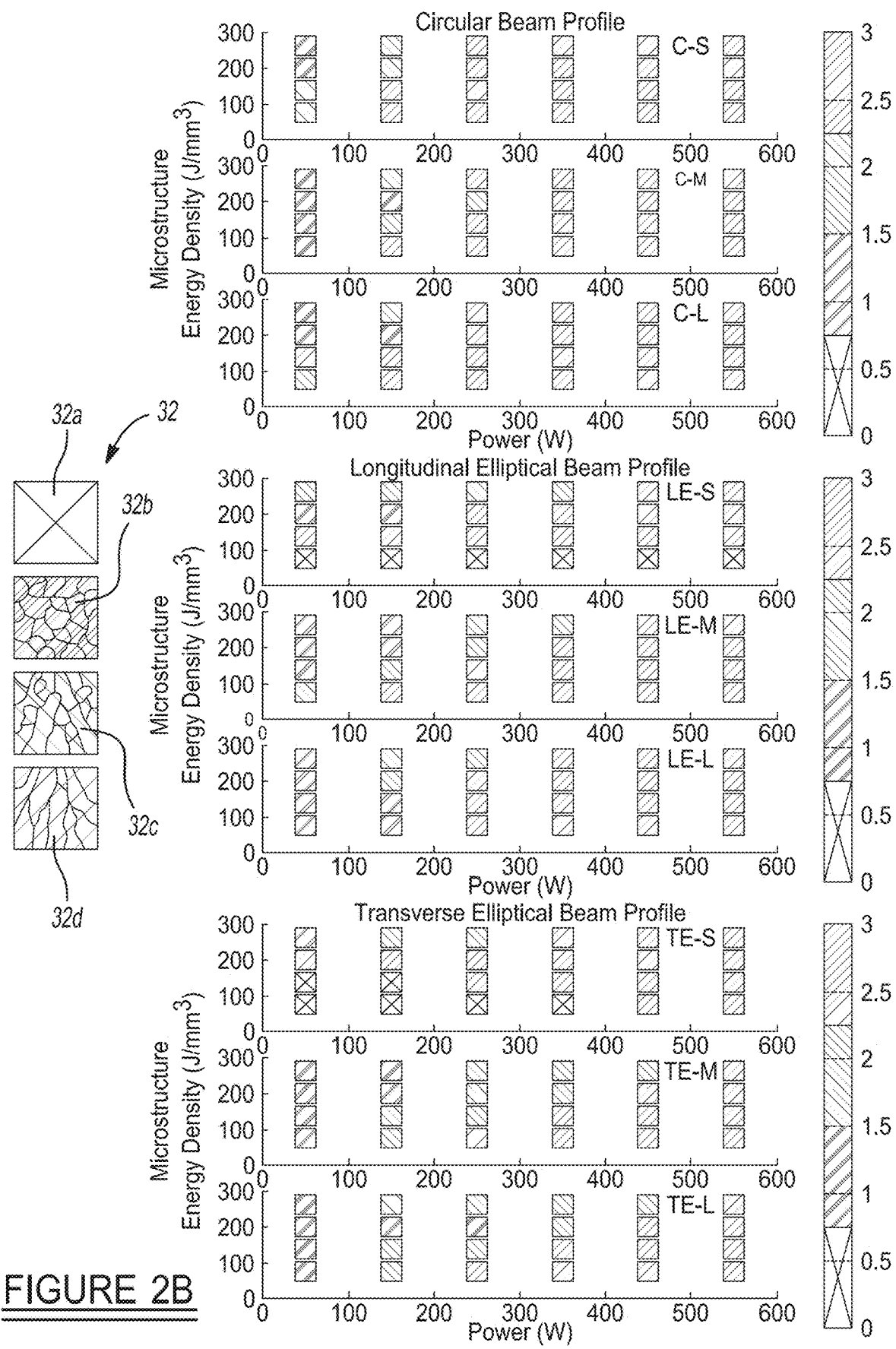
FIG. 2B shows graphs indicating solidification microstructures that were formed using the circular-Gaussian, longitudinal-elliptical and transverse-elliptical beam shapes.

Referring to FIGS. 2A and 2B, the results of tests conducted with different beam profiles are shown. FIG. 2A illustrates energy density (J/mm$^3$) versus laser power (W) when using a circular beam profile, a longitudinal-elliptical beam profile and a transverse-elliptical beam profile. It will be appreciated that by "longitudinal-elliptical" beam profile, it is meant a beam profile in which the major axis of an elliptical beam is arranged parallel to (i.e., along) the direction of beam travel, as shown in FIG. 3. The term "transverse-elliptical" means that the beam 16a is arranged with its major axis perpendicular to the direction of beam travel, as indicated in FIG. 4. The term "circular" beam simply means a beam with a circular (i.e., symmetric) profile, as shown in FIG. 5. It will also be appreciated that the elliptical beam could be formed with its major axis extending at any point between 0 degree and 90 degrees relative to the path of travel of the beam, and thus the orientation of the elliptical beam is not limited to either being perfectly parallel to the axis of movement of the beam or perfectly perpendicular to the axis of movement. More broadly, the symmetry of the beam can be reduced further from an ellipse to form optimized shapes for microstructure control.

In FIG. 2A, legend 30 represents different colors in which "0"=no deposition, "1"=low substrate wetting with necking between a nearly-spherical melt bead and the substrate, "2"=good substrate wetting by a semicircular melt bead with no substrate penetration (d/w approximately equal to 0), 3=shallow substrate penetration (0<d/w≤0.5) with conduction-mode laser melting, "4"=intermediate substrate penetration (0.5<d/w≤0.8) and "5"=deep substrate penetration (0.8<d/w) with keyhole-mode laser melting. FIG. 2B illustrates solidification microstructures formed by the circular, longitudinal-elliptical and transverse-elliptical beams of FIG. 2A. Legend 32 indicates the specific microstructures that are represented by the colors in the graphs of FIG. 2B. The legend 30 shows that the color grey, box 32a, represents no fusion; the light green color, box 32b, represents equiaxed microstructures; the color teal, box 32c, represents mixed equiaxed-columnar microstructures; and the dark blue color, box 32d, represents columnar microstructures. The grain morphology was examined at two different scales: (1) at the grain morphology level, and (2) at the solidification substructure level, which is also referred to as the "solidification pattern". The grain morphology can vary from equiaxed to columnar, while the solidification substructure can vary from planar to cellular to dendritic. While columnar grains are elongated and often nucleate epitaxially at the fusion boundary, equiaxed grains can develop anywhere in the melt. These differences in microstructure will result in changes in local mechanical properties that can be exploited to globally optimize an AM component.

FIG. 2B also shows that the longitudinal-elliptical beam and the transverse-elliptical beam produce a higher percentage of equiaxed microstructures, as well as a higher percentage of mixed equiaxed/columnar microstructures, as compared to what is achieved with a circular beam. Generally, regardless of beam ellipticity or size, equiaxed solidification was favored at lower laser powers, particularly when substrate penetration by the melt was poor.

With increasing power, the concentration of columnar grains created increases, as shown in the scanning electron microscope pictures of FIGS. 6A-6C. FIGS. 6A-6C show cross sections of melt track roots produced using a circular-Gaussian-medium ("C-M") beam profile (FIG. 5) at constant energy density (260 J/mm3) and varying power: FIG. 6A at P=50 W; FIG. 6B at P=250 W; and FIG. 6C at P=550 W. The percent area occupied by columnar grains 42, as opposed to equiaxed grains 40, increases with increasing laser power and decreasing scan speed. The C-M beam profile used to generate the melt track roots had a diameter of 187 um.

FIGS. 7A-7C show cross-sections of melt track roots produced at constant beam size, power and energy density as the beam shape is varied: FIG. 7A melted by C-M (diameter=187 μm), FIG. 7B melted by LE-M (longitudinal-elliptical, 351 μm×95 μm), and FIG. 7C melted by TE-M (transverse-elliptical, 95 μm×351 μm). The percent area occupied by equiaxed grains (as opposed to columnar grains) is about 2% for the example shown in FIG. 7A (using C-M beam), about 28% in FIG. 7B (using LE-M beam) and about 78% in FIG. 7C (using TE-M beam). The substrate penetration depths were 71.9 μm, 73.3 μm and 78.0 μm for the CE-M, LE-M and TE-M beam profiles, respectively. Thus, even without changing laser power, scan speed, or beam size, a greater area fraction of equiaxed grains can be achieved for the LE (longitudinal-elliptical) and TE (transverse-elliptical) beam profiles. The tendency for elliptical beam profiles to increase the area fraction of equiaxed grains is generally observed at d/w approximately equal to 0.2-0.5, when conduction-mode laser heating of the substrate and powder assembly occurs.

Figure 8:
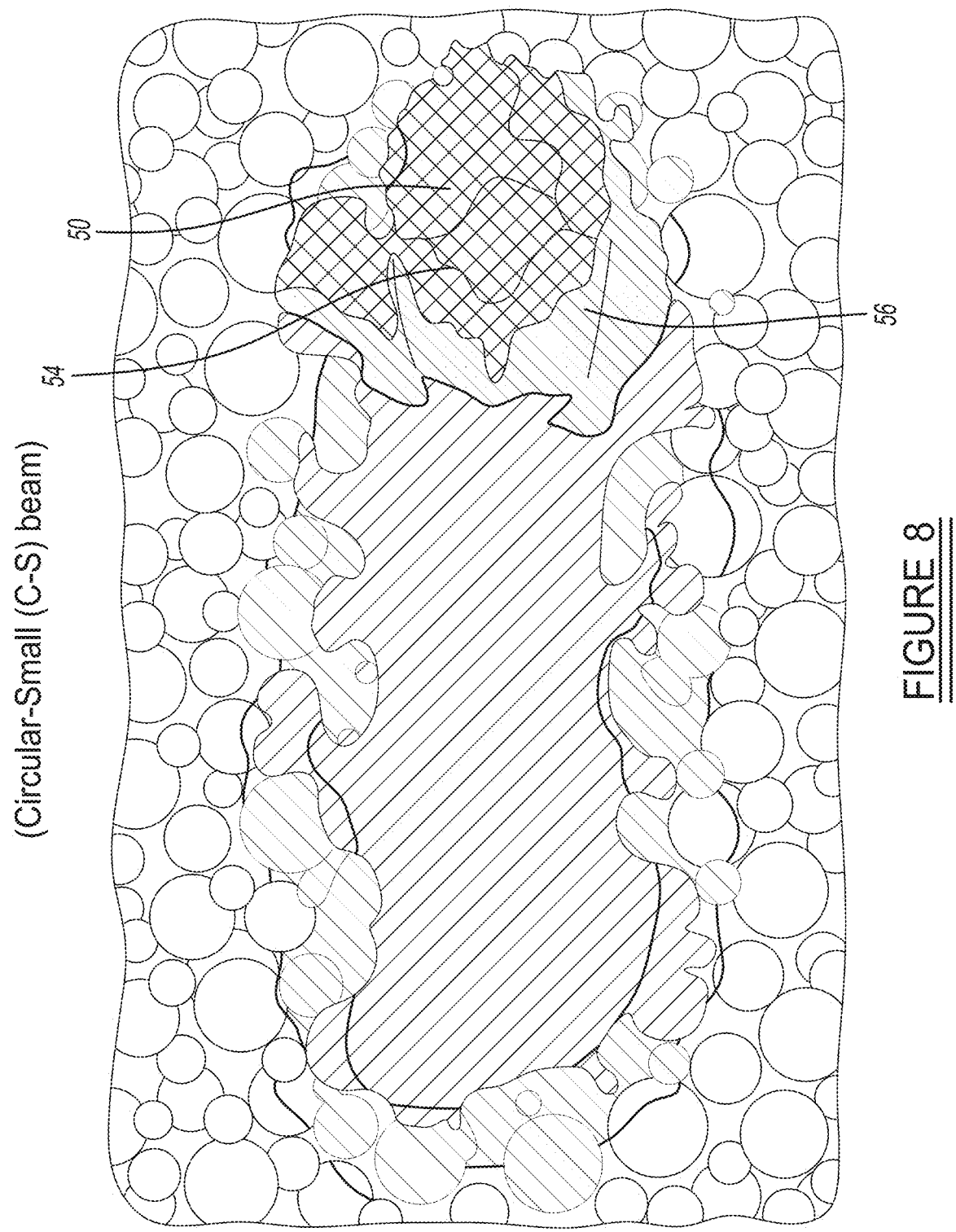
FIG. 8 is a top-down (planar) view of a simulation of a melt-track formation using a circular small-sized beam shape.
Figure 9:
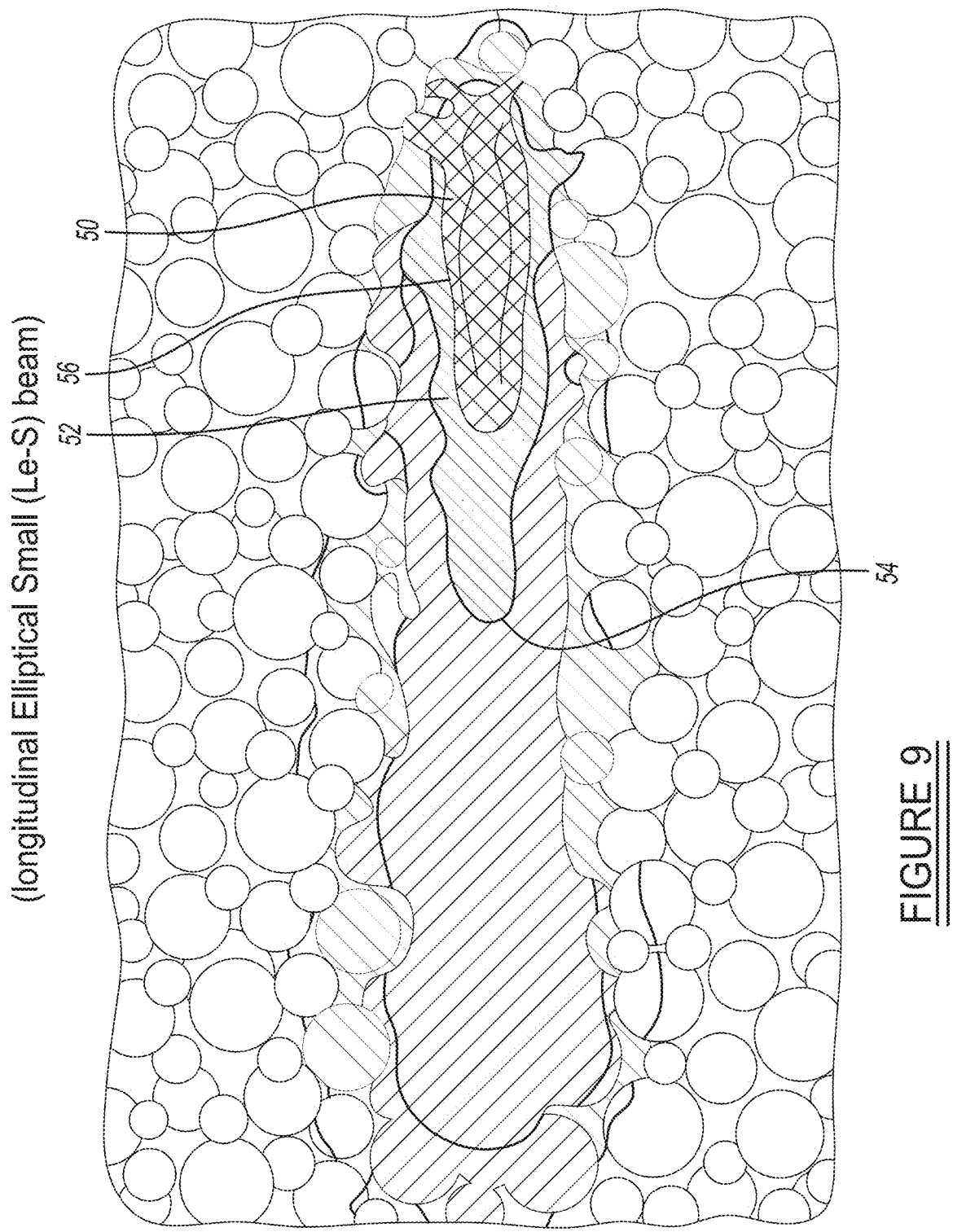
FIG. 9 is a top-down (planar) view of a simulation of a melt-track formation using a longitudinal-elliptical small-sized beam shape.
Figure 10:
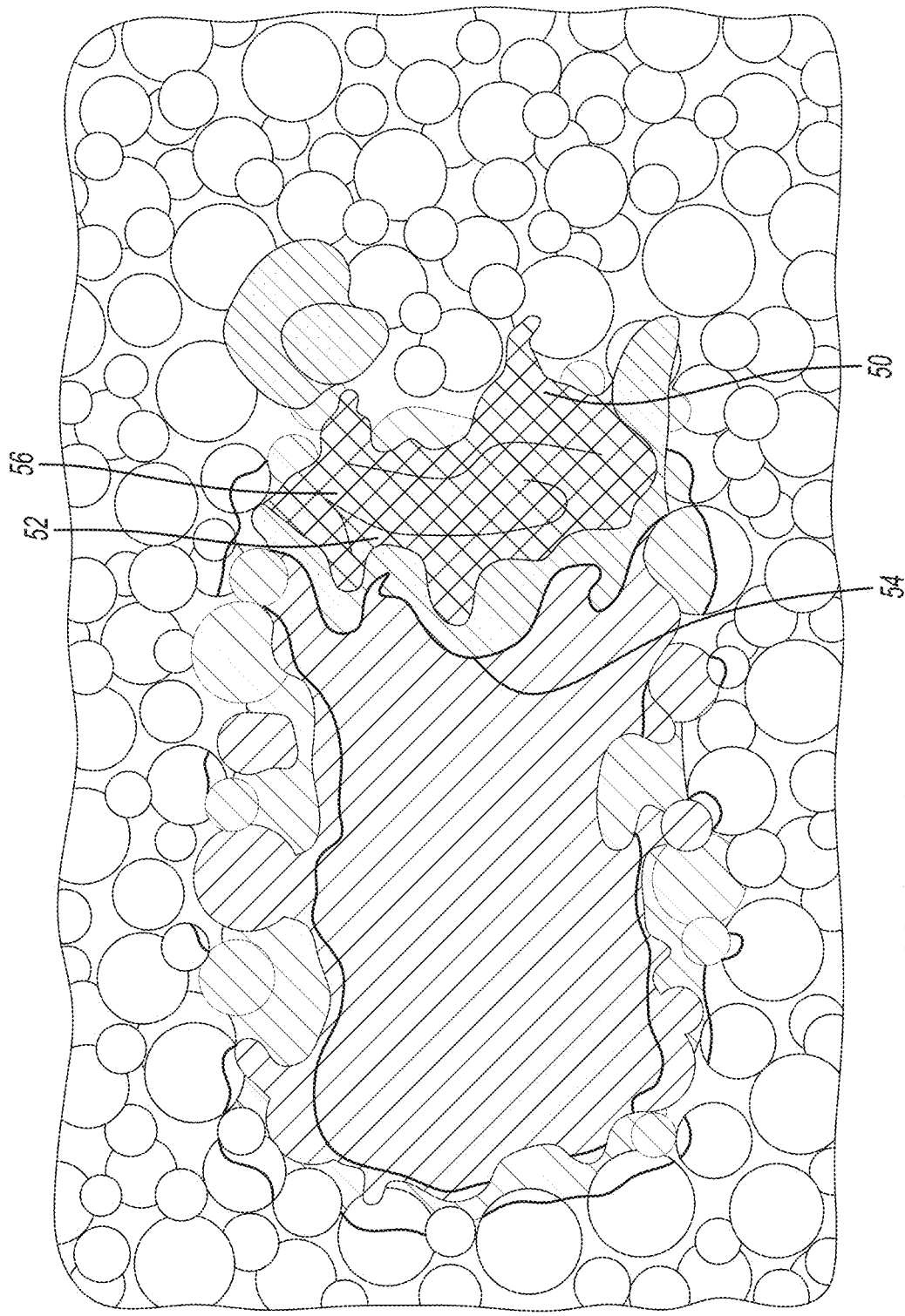
FIG. 10 is a top-down (planar) view of a simulation of a melt-track formation using a transverse-elliptical small-sized beam shape.
Figure 11A:
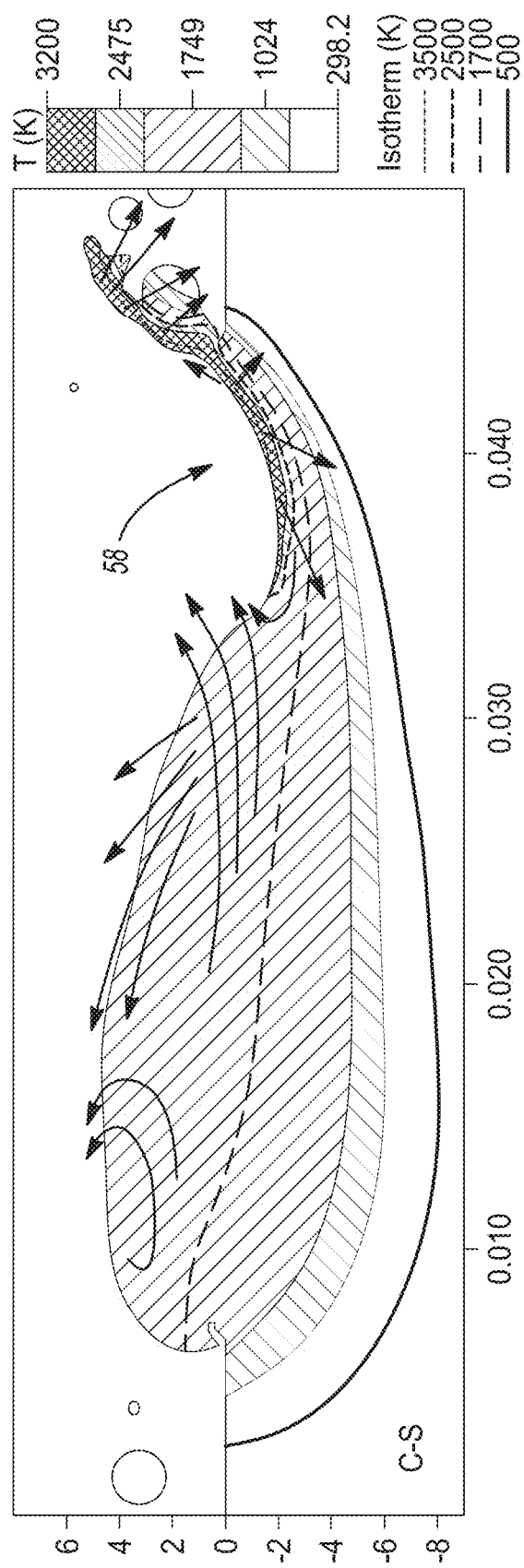
FIG. 11A is a cross sectional side view of the melt track formation simulation of FIG. 8 (i.e., using a circular, small-sized beam shape)
Figure 11B:
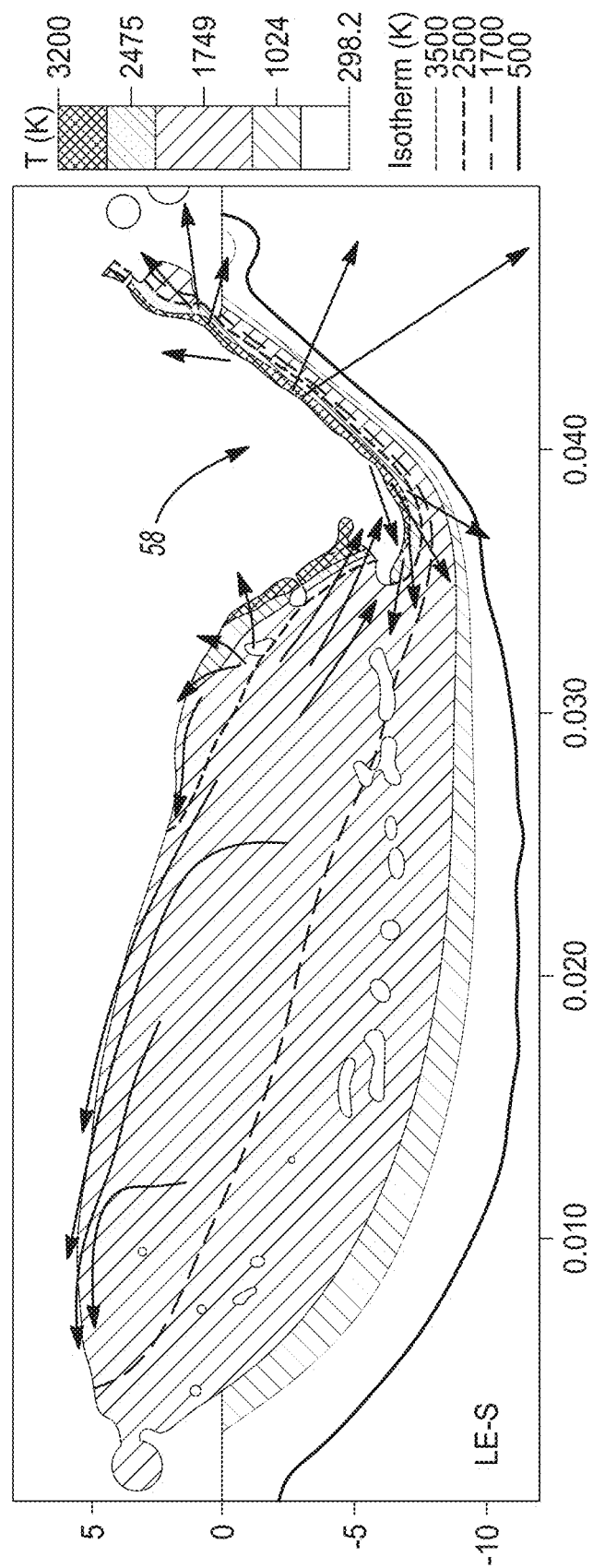
FIG. 11B is a cross sectional side view of the melt track formation simulation of FIG. 9 (i.e., using a longitudinal elliptical small-sized beam shape)
Figure 11C:
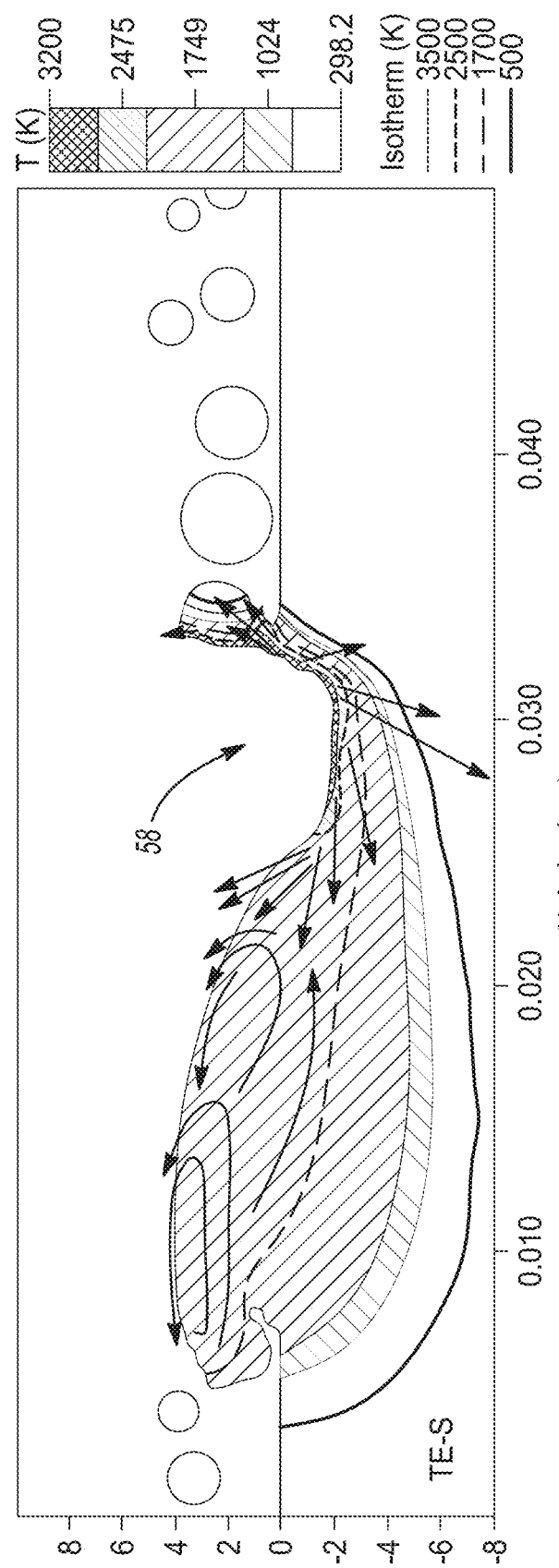
FIG. 11C is a cross sectional side view of the melt track formation simulation shown in FIG. 10 (i.e., using a transverse elliptical small-sized beam shape)

Referring to FIGS. 8, 9 and 10, (and their corresponding side view melt-track formation simulations in FIGS. 11A, 11B and 11C, respectively) the melt track formation is shown for C-S (circular-small, 98 μm diameter) beam profile (FIG. 8A), a LE-S (longitudinal-elliptical-small, 201 μm×53 μm) beam profile (FIG. 9A) and a TE-S (transverse-elliptical-small, 53 μm×201 μm) beam profile (FIG. 10A), where laser scanning occurs in the positive X-direction. The pseudo colors correspond to temperature linearly, where red is 3200 K and blue is room temperature. The isothermal contours were assigned as follows: gray=500 K, red=1700 K, fuchsia=2500 K, black=3500 K. The sizes of the melt velocity vectors scale with magnitude. Each melt track shown in FIGS. 8/11A, 9/11B and 10/11C shows a topological depression (identified best as depression 58 in FIGS. 11A, 11B and 11C) at the laser beam spot formed by the recoil pressure. The shape of the depression resembles the beam shape used for melting (as best seen in FIGS. 8, 9 and 10). It will be noted that the highest melt flow velocities are reached using the elliptical beam shapes.

The physics of melt flow during laser AM has been explained by Khairallah et al. using a mesoscopic approach that accounts for the random packing of particles using real powder size distributions (Saad A. Khairallah, Andrew T. Anderson, Alexander Rubenchik, Wayne E. King, "*Laser Powder-Bed Fusion Additive Manufacturing: Physics of Complex Melt Flow and Formation Mechanisms of Pores, Spatter, and Denudation Zones*", Acta Mater., Vol. 108, April 2016, pp. 36-45. https://doi.org/10.1016/j.actamat.2016.02.014). This treatment realistically captures thermal conductivity through the powder bed and the role of surface tension in irregular track surface break-up or balling. Fluid flow in the melt track was calculated by coupling the strong hydrodynamic flow caused by the topological depression beneath the laser spot to Marangoni surface flow, evaporative and radiative cooling. The melt track was considered in three sections: the topological depression, the transition region, and the tail region. For the Gaussian and elliptical profiles, a vortex flow was found trailing the depression (see FIGS. 11A, 11B and 11C). Notably, higher melt flow velocities are reached in the melt pool using the elliptical beams, where solidification is taking place.

The co-inventors have also built stainless steel parts demonstrating grain refinement by LPBF using the teachings described herein. Turbulent melt flow was created by modulating the laser beam at frequencies in the range of 1, 5, 10, and 25 Hz. The spatial intensity profile exhibited strong peaks which created hot spots in the melt and drove aggressive convective flow.

Figure 12A:
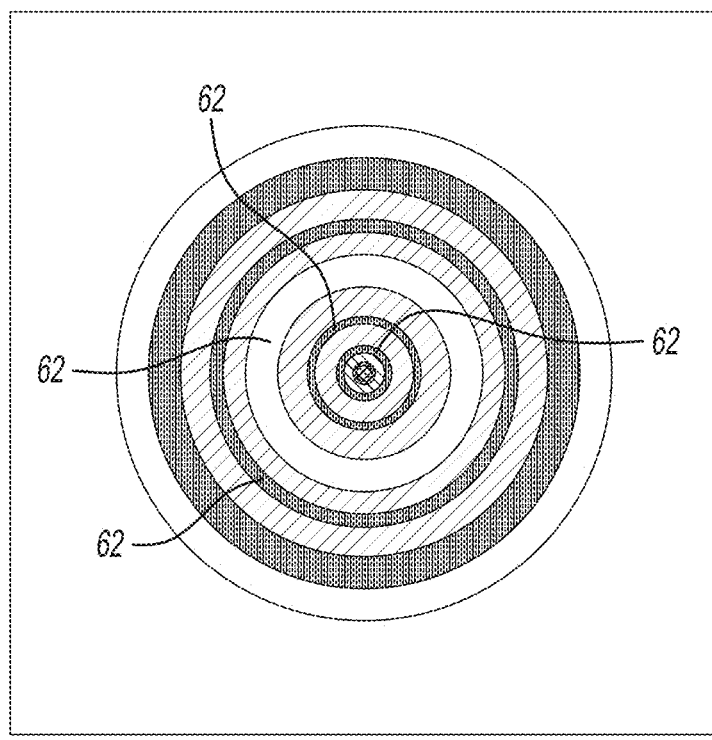
FIG. 12A shows a plan view simulation of a circular complex beam profile with a plurality of ripples.
Figure 12B:
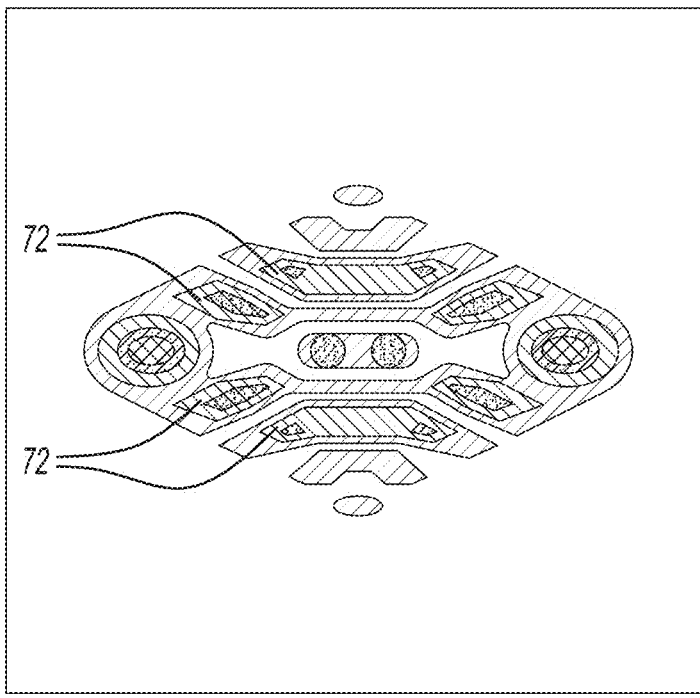
FIG. 12B shows a plan view simulation of an elliptical complex beam profile with a plurality of ripples.

FIGS. 12A and 12B show further simulations of complex beam intensity profiles. FIG. 12A shows an example of a circular complex beam intensity profile 60 having a plurality of ripples 62, where the ripples 62 each represent a change in beam intensity. FIG. 12B shows an example of an elliptical complex beam profile 70 with a plurality of ripples 72, where the ripples 72 each represent a change in beam intensity.

It will also be appreciated that a number of options and enhancements may also be integrated into the system in different embodiments. For example, and without limitation, the system 10 could be configured to use more than one laser beam. The system 10 could also be configured so that the polarization state of the laser light is varied in real time. The system 10 could also be configured so that a light source other than a laser is used for spatial or temporal modulation of the energy source. Still further, the system 10 could be configured with different diffractive optical elements to produce the different beam shapes described herein. The system 10 could optionally be configured to have combined refractive and diffractive optical elements to produce the various beam shapes described herein. Still further, the system 10 could be configured with only refractive optical elements used to produce the beam shapes described herein.

Still further, it will be appreciated that while the above discussion has focused around the teachings presented herein being used in connection with an additive manufacturing process, that the system and method of the present disclosure may be used in virtually any operation where it is desired to tailor the microstructures of a material layer, as powder particles making up the material layer are heated, melt and solidify.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for forming a material layer, comprising:
an optical light source for generating an optical beam;
a beam shaping subsystem configured to receive and shape the optical beam to generate a complex beam intensity profile having an elliptical shaped beam intensity profile, the elliptical shaped beam intensity profile being used to selectively melt at least portions of a powder bed of powder particles residing on a substrate during formation of a material layer, as at least one of the optical light source or the powder bed is moved;
a computer for controlling the optical light source; and
the elliptical shaped beam intensity profile further being controlled by the computer such that the computer determines whether a longitudinal axis thereof is to be orientated either parallel or perpendicular to a path of travel of the optical beam, to control microstructures within the material layer formed during solidification of the melted powder particles, to tailor a desired portion of the microstructure to form equiaxed grains in at least a portion of the material layer.

2. The system of claim 1, wherein the beam shaping subsystem is controllable by the computer to create the elliptical shaped beam intensity profile.

3. The system of claim 2, further comprising:
a non-volatile memory operably associated with the computer; and
a beam shaping software module contained in the non-volatile memory for controlling the beam shaping subsystem to create the elliptical shaped beam intensity profile.

4. The system of claim 1, wherein the computer is configured to control a power of the optical light source to vary the power during formation of the material layer.

5. The system of claim 1, wherein the computer is configured to vary a power of the optical light source while forming the material layer.

6. The system of claim 1, wherein the computer is configured to control a scan speed of the elliptical shaped beam intensity profile, and to vary the scan speed as the elliptical shaped beam intensity profile is moved over the powder bed.

7. The system of claim 1, wherein the computer is configured to control each of a scan speed of the elliptical shaped beam intensity profile, a power and an orientation of the elliptical shaped beam intensity profile, and to vary at least one of the scan speed, the orientation of the elliptical shaped beam intensity profile, and the power, in real time, during melting of the powder bed.

8. The system of claim 1, wherein the computer is configured to control the beam shaping subsystem to change the shape of the elliptical shaped beam intensity profile, while forming the material layer, to a complex desirable beam profile including at least one of: a circular non-Gaussian beam profile, a transverse-elliptical beam profile, a longitudinal-elliptical beam profile, and a beam with a plurality of ripples.

9. The system of claim 8, wherein the computer is configured to control the beam shaping subsystem to change the shape of the elliptical shaped beam intensity profile in real time, while forming the material layer.

10. The system of claim 1, wherein the computer is configured to change the elliptical shaped beam intensity profile to a circular beam profile while forming the material layer to control the creation of at least one of a percentage of equiaxed grains of a layer or a location within the material layer where the equiaxed grains are formed.

11. An additive manufacturing system, comprising:
a laser for generating a laser beam;
a beam shaping subsystem configured to receive and shape the laser beam to selectively generate a complex-shaped beam profile having an elliptical shape, to selectively melt at least portions of a powder bed of powder particles residing on a substrate during formation of a layer of a part, as the laser beam is moved;
a computer configured to control the beam shaping subsystem; and
an orientation of the elliptical shape of the complex shaped beam profile being selected by the computer to such that the computer determines whether a longitudinal axis of the elliptical shape is to be orientated either parallel or perpendicular to a path of travel of the laser beam, to control microstructures of grains formed during melting of the powder particles to increase a percentage of equiaxed grains relative to columnar grains formed in the melted powder bed.

12. The system of claim 11, wherein the computer is configured to control the beam shaping subsystem so that the beam shaping subsystem changes between producing a Gaussian beam shape and the elliptical beam shape during formation of one layer of the part.

13. The system of claim 11, wherein the computer is configured to control a power of the laser beam to change the power of the laser beam while scanning the laser beam over the powder bed.

14. A method for additively manufacturing a part, the method comprising:
generating an optical beam;
shaping the optical beam to produce a complex shaped beam profile having a uniform elliptical shape;
using the complex shaped beam profile to selectively melt at least portions of a powder bed of powder particles residing on a substrate during formation of a layer of a part, as at least one of the optical beam or the powder bed is moved;
using a computer to control a power of the optical beam, and further using the computer to control orientation of the uniform elliptical shape such that the computer determines whether a longitudinal axis thereof is to be selectively orientated either parallel or perpendicular to a path of travel of the optical beam; and
using the complex shaped beam profile to control microstructures of grains formed during melting of the powder particles, to tailor a formation of equiaxed grains relative to columnar grains formed in the powder bed as the powder bed is melted.

15. The method of claim 14, further comprising changing the shaping of the optical beam into a circular complex beam profile while melting the powder bed.

* * * * *